H. E. BUTCHER.
METHOD OF AND APPARATUS FOR MAKING TUBING.
APPLICATION FILED APR. 1, 1914.
1,205,512.
Patented Nov. 21, 1916.
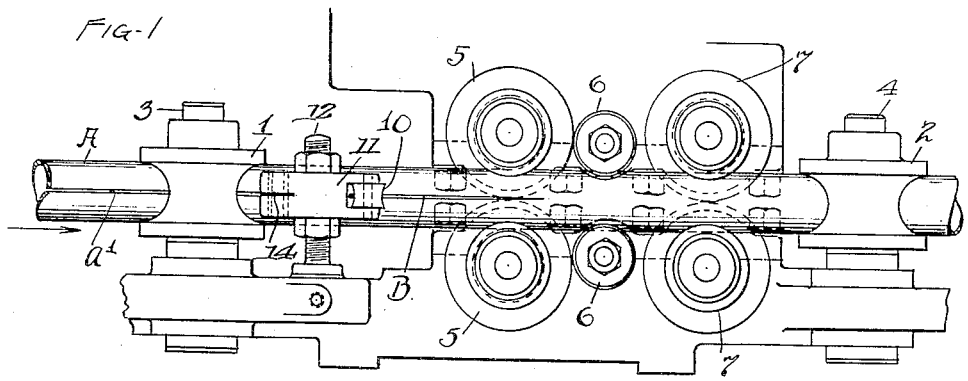
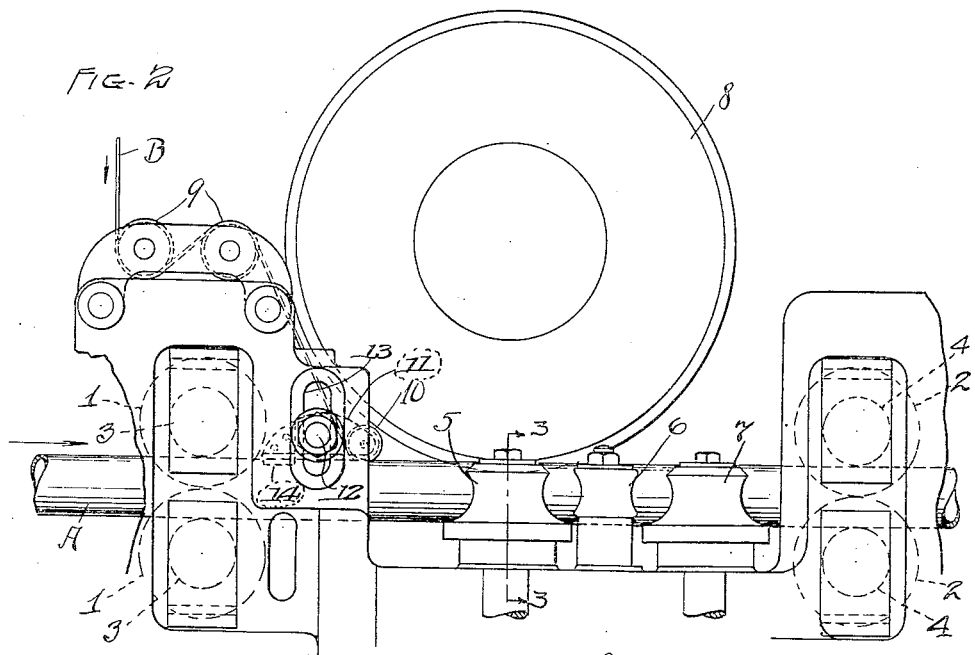
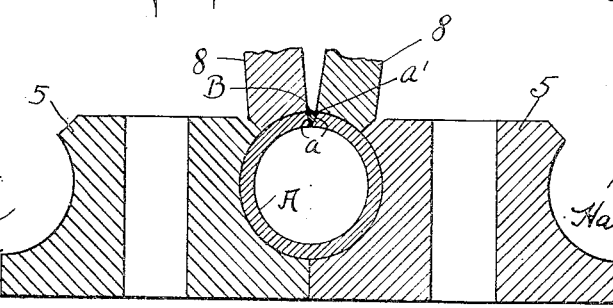
WITNESSES:
INVENTOR
Harry E. Butcher
BY Fay & Oberlin
ATTORNEYS

UNITED STATES PATENT OFFICE.

HARRY E. BUTCHER, OF CLEVELAND, OHIO, ASSIGNOR TO THE STANDARD WELDING COMPANY, OF CLEVELAND, OHIO, A CORPORATION OF OHIO.

METHOD OF AND APPARATUS FOR MAKING TUBING.

1,205,512.  Specification of Letters Patent.  Patented Nov. 21, 1916.

Application filed April 1, 1914. Serial No. 828,789.

*To all whom it may concern:*

Be it known that I, HARRY E. BUTCHER, a citizen of the United States, and a resident of Cleveland, county of Cuyahoga, and State of Ohio, have invented a new and useful Improvement in Methods of and Apparatus for Making Tubing, of which the following is a specification, the principle of the invention being herein explained and the best mode in which I have contemplated applying that principle, so as to distinguish it from other inventions.

The present improvements, relating as indicated to the manufacture of tubing, have more particular regard to the manufacture of so-called brazed tubing, wherein a strand of braze material is inserted between the edges of the preliminarily formed tube and such edges then joined together by the fusion of such braze, the latter uniting more or less firmly with the edges respectively, and filling any interstices between the same. For many uses, tubing of this character is just as satisfactory as that in which the edges of the preliminarily formed tube are directly welded together to form a homogeneous mechanical juncture.

The object of the present invention is to provide a simple and convenient method for inserting the brazed material between the edges of the preliminarily formed tube, and for thereupon fusing such braze-material; and to this end the invention consists of the steps and means for carrying out the same, hereinafter fully described and particularly pointed out in the claims.

The annexed drawing and the following description set forth in detail certain mechanism embodying the invention, such disclosed means constituting, however, but one of various ways in which the principle of the invention may be used.

Figure 1 is a plan view of an apparatus adapted for the carrying out of my improved process of making brazed tubing; Fig. 2 is a side elevational view of the same; and Fig. 3 is a transverse cross sectional view on a larger scale, of a portion of such apparatus, the plane of the section being indicated by the line 3—3, Fig. 2.

According to my present improved process, the strip metal is preliminarily formed into a tube-blank A, with the edges *a* in proper abutting relation as shown in Fig. 3, for example. Such blank tubing, unless subjected to special manipulation will have a V-shaped groove *a'* formed between the meeting edges of the strip of material, for since the outer diameter of the tube is necessarily greater than the inner diameter, the inner edge of the strip will meet first. It is into the groove or trough thus formed, that the braze-material is fed, as will be presently described, preliminarily to interfusing such material with the respective edges. The heat for thus fusing the braze and raising the temperature of the tube-edges to the proper degree is preferably produced electrically by passing a heating electric current from one side of the line of junction across through such edges and interposed braze-material.

It will, of course, be understood that the step of preliminarily forming the tube may be accomplished either separately from the welding or brazing step, or simultaneously and in unison therewith, as may be found most convenient. This forming step is not illustrated, since it is not directly involved as a part of the present invention, and furthermore, the formation of tubing out of strip metal, or skelp, both in continuous and discontinuous lengths, has long been known in the art. For feeding the tubing thus preliminarily formed, past the welding mechanism proper, a series of feed rolls arranged in pairs are employed in the form of apparatus illustrated, one pair 1, 1 being located forwardly and another 2, 2 being located to the rear of the point, or points, where the heating occurs, said two sets of feed rolls being respectively carried on horizontal spindles or shafts 3, 3 and 4, 4, which are connected to be driven in unison in the proper direction by means of suitable gearing, not shown.

Between the two sets of feed rolls 1, 1 and 2, 2, I provide a plurality of pressure rolls arranged in pairs, three such rolls, 5, 6 and 7 being shown on each side of the line on the tubing. The function of these rolls is partly to assist in the feeding operation and principally to retain the abutting edges *a* of the tubing in such degree of contact as may be found necessary. As illustrated, the first two and the last two pairs 5, 5 and 7, 7 of these pressure rolls are intergeared and arranged to be positively driven just as the feed rolls proper; while the intermediate pair 6, 6 of such pressure rolls are merely idler rolls.

For conveying the electric current to the tube, two welding electrodes 8, 8 are provided, such electrodes preferably taking the form of relatively large disks, the edges of which are of proper cross-section to conform with the shape of the tubing being welded, as shown in Fig. 3. It will be understood that such electrodes are omitted from the illustration in Fig. 1 in order to avoid confusion; their location, however, relatively to the other parts of the apparatus, is clearly indicated in Fig. 2, such location being preferably such that they contact with the work at a point substantially adjacent to the foremost pair of pressure rolls 5, 5. The manner in which such electrodes are supported, as well as the way in which current is supplied thereto, are of no interest in the present connection, it being understood that they are respectively connected with a suitable source of electric current as, for example, with the secondary of a transformer, the character and the rate of flow of the current being so gaged, having regard to the rate at which the work is being fed through the machine, that the edges of the tube and the braze across which the current is thus caused to flow will be raised to the desired temperature.

Just in front of the pair of electrodes 8, 8, I arrange a suitable device for feeding progressively into the groove formed between the meeting edges of the tubing, a strand or strip B of braze-material. A supply of this material in the form of a coil will be supported at a suitable point about the apparatus on a reel, or the like (not shown), and is thence fed over guiding and straightening rolls 9 to a pressure roll 10 that contacts with the upper face of the preliminarily formed tube at a point just in advance of the heating electrodes 8. This roller is rotatably mounted in the one end of an elongated holder 11 that is supported intermediately of its ends above the tube by means of a threaded stud 12 adjustably held in a vertical slot 13 in the machine frame (see Fig. 2). In the opposite end of the holder from said roller 10, is fixed a plate or finger 14, that is designed to fit in the space or groove a' formed between the meeting edges of the tubing. This member serves both to guide such tubing, that is to hold the same in proper axial position, and to clear the groove for the reception of the solder strip B. The roller 10 bridges the groove a' just referred to as being formed between the edges of the tubing and serves, once the apparatus is started in operation, to force the braze-material into such groove, as well as to draw the material continuously down over the rolls 9 from the reel. The effect of this roll is to press the wire into the groove with sufficient force to more or less completely fill the same, as shown in Fig. 3; accordingly, the current that is passed across the edges of the tube between the two electrodes also passes through this material, the current being such that the braze is entirely fused and the edges themselves brought to a temperature at which such braze readily unites therewith, thereby producing a well brazed joint.

I have found that by means of the foregoing steps and apparatus, brazed tubing can be manufactured either continuously or in sections having any desired length, at a very rapid rate, and with a relatively small consumption of current. At the same time, a uniformly satisfactory product is secured, and one that requires but little further attention in the way of finishing it, at least so far as concerns the joint, as the amount, or cross section, of the filament of braze material can be gaged to approximately just fill the groove, thereby producing a smooth exterior surface at the joint, the inner edges of the tube being held in sufficiently close contact to prevent the braze from escaping into the interior of the tube.

Other modes of applying the principle of my invention may be employed instead of the one explained, change being made as regards the steps or mechanism herein disclosed, provided the means stated by any of the following claims or the equivalent of such stated means be employed.

I therefore particularly point out and distinctly claim as my invention:—

1. In apparatus of the character described, the combination of means adapted to maintain a preliminarily formed tube with its edges abutting under pressure and at the same time progressively feed such tube; other means adapted to feed a strand of braze-material between the edges of such tube; and electrodes independent of said first-named means disposed to contact with such tube adjacent to such edges, whereby a heating electric current may be passed across the latter and the interposed braze-material.

2. In apparatus of the character described, the combination of rolls adapted to maintain a preliminarily formed tube with its edges abutting under pressure and at the same time progressively feed such tube; means adapted to feed a strand of braze-material between the edges of such tube; and electrodes independent of said rolls disposed to contact with such tube adjacent to such edges, whereby a heating electric current may be passed across the latter and the interposed braze-material.

3. In apparatus of the character described, the combination of rolls adapted to maintain a preliminarily formed tube with its edges abutting under pressure and at the same time progressively feed such tube; means adapted to feed a strand of braze-material between the edges of such tube; a roller adapted to forcibly press such strand into any space between such edges; and electrodes independent of said rolls disposed to contact with such tube adjacent to such edges, whereby a heating electric current may be passed across the latter and the interposed braze-material.

4. In apparatus of the character described, the combination of rolls adapted to maintain a preliminarily formed tube with its edges abutting under pressure and at the same time progressively feed such tube; means adapted to feed a strand of braze-material between the edges of such tube; a roller adapted to forcibly press such strand into any space between such edges; and electrode rolls, independent of said feed and pressure rolls, disposed to contact with such tube adjacent to such edges, whereby a heating electric current may be passed across the latter and the interposed braze-material.

5. In apparatus of the character described, the combination of rolls adapted to maintain a preliminarily formed tube with its edges abutting under pressure and at the same time progressively feed such tube; means adapted to feed a strand of braze-material between the edges of such tube; a holder vertically adjustable relatively to such tube; a roller rotatably mounted in said holder and adapted to forcibly press such strand into any space between such edges; and electrode rolls, independent of said feed and pressure rolls, disposed to contact with such tube adjacent to such edges, whereby a heating electric current may be passed across the latter and the interposed braze-material.

6. In apparatus of the character described, the combination of rolls adapted to maintain a preliminarily formed tube with its edges abutting under pressure and at the same time progressively feed such tube; means adapted to feed a strand of braze-material between the edges of such tube; a holder vertically adjustable relatively to such tube; a roller rotatably mounted in one end of said holder and adapted to forcibly press such strand into any space between such edges; a finger fixedly mounted in the other end of said holder and adapted to fit in such space; and electrode rolls, independent of said feed and pressure rolls, disposed to contact with such tube adjacent to such edges, whereby a heating electric current may be passed across the latter and the interposed braze-material.

7. In apparatus of the character described, the combination of rolls adapted to maintain a preliminarily formed tube with its edges abutting under pressure and at the same time progressively feed such tube; means adapted to feed a strand of braze-material between the edges of such tube; a stud extending transversely of, and vertically adjustable relatively to, such tube; an elongated holder supported on such stud intermediately of its ends; a roller rotatably mounted in one end of said holder and adapted to forcibly press such strand into any space between such edges; a finger fixedly mounted in the other end of said holder and adapted to fit in such space; and electrode rolls, independent of said feed and pressure rolls, disposed to contact with such tube adjacent to such edges, whereby a heating electric current may be passed across the latter and the interposed braze-material.

Signed by me, this 30th day of March, 1914.

HARRY E. BUTCHER.

Attested by—
JNO. F. OBERLIN,
D. T. DAVIES.